United States Patent
Hatzilakos

(10) Patent No.: US 7,975,476 B2
(45) Date of Patent: Jul. 12, 2011

(54) PRODUCTION OF ELECTRIC ENERGY FROM SEA WAVES

(76) Inventor: Constantinos A. Hatzilakos, Papagos (GR)

( * ) Notice: Subject to any disclaimer, the term of this patent is extended or adjusted under 35 U.S.C. 154(b) by 334 days.

(21) Appl. No.: 12/227,043

(22) PCT Filed: Apr. 26, 2007

(86) PCT No.: PCT/GR2007/000023
§ 371 (c)(1),
(2), (4) Date: Jan. 5, 2009

(87) PCT Pub. No.: WO2007/129126
PCT Pub. Date: Nov. 15, 2007

(65) Prior Publication Data
US 2009/0158729 A1    Jun. 25, 2009

(30) Foreign Application Priority Data
May 8, 2006  (GR) .................................. 060100482

(51) Int. Cl.
*F03C 1/00*  (2006.01)
(52) U.S. Cl. ................. 60/497; 60/498; 60/500; 60/504; 60/505
(58) Field of Classification Search ............. 60/497–507
See application file for complete search history.

(56) References Cited

U.S. PATENT DOCUMENTS

| | | | |
|---|---|---|---|
| 628,457 A | 7/1899 | Gehre | |
| 953,600 A | 3/1910 | Edens | |
| 1,292,303 A | 1/1919 | Garwood | |
| 2,179,537 A | 11/1939 | Zoppa | |
| 4,469,955 A | 9/1984 | Trepl, II | |
| 4,598,547 A | 7/1986 | Danihel | |
| 5,311,064 A * | 5/1994 | Kumbatovic | 290/53 |
| 5,374,850 A * | 12/1994 | Cowen | 290/53 |
| 5,789,826 A * | 8/1998 | Kumbatovic | 290/53 |
| 6,269,636 B1 * | 8/2001 | Hatzilakos | 60/398 |

FOREIGN PATENT DOCUMENTS

| | | |
|---|---|---|
| GB | 2 064 665 | 6/1981 |
| GB | 2 325 708 A | 12/1998 |
| WO | WO 99/14489 | 3/1999 |
| WO | WO 00/75506 A | 12/2000 |

* cited by examiner

*Primary Examiner* — Hoang M Nguyen

(57) ABSTRACT

A power plant using sea waves comprising a float, a horizontal shaft. The float (1/1) of a spherical or cylindrical shape made with plastic or metal material, empty filled with ballast, floats half emerged and transfers the wave vertical motions to a vertical metal beam (1/2) which can be increased or decreased in order to deal with the tidal changes of the sea level. The vertical beam is attached with knuckle joins, at one end with the float and at the other with horizontal beam of rectangular metal triangle which transfers the vertical motions at the horizontally moving forwards and backwards saw (1/5) with the two chains (1/6) and (3/20) which rotate two pairs of gears each gear of a pair to the diametrically opposite side, so that with every movement one gear produces action while the other gear of the pair moves freely. The gears rotate the horizontal shaft which is fitted on them (3/8) and the shaft gives motion to the generator.

5 Claims, 5 Drawing Sheets

PRODUCTION OF ELECTRIC ENERGY FROM SEA WAVES

This application claims the benefits under 35 U.S.C. 119 (a)-(d) or (b), or 365(b) of International Application No. PCT/GR2007/000023 filed 26 Apr. 2007, and Greece Patent Publication Application No. 2006/0100482 filed 8 May 2006.

This invention refers to a method for the production of electric energy using the forces of sea waves. Even though the waves of the sea are an inexhaustible energy resource, until now, no method which could be put to industrial use, both economically and practically applicable, has been announced. Efforts have been made, but the practices which were applied, proved to be too complex, very expensive, unsafe and difficult in their use. The systematic study of the principles and the problems involved, led to the invention of a new method.

BACKGROUND OF THE INVENTION

The new method, which is invented, is based on previous invention Nos. WO 99/014489-(HATZILAKOS) and U.S. Pat. No. 6,269,636 (HATZILAKOS).

The new converter has completely new technical characteristics, different functions and new innovations. Here are some basic differences from the previous invention:

The float instead of firm connection with the vertical metal beam is connected with knuckle joint. Another knuckle joint connects the upper end of the vertical metal beam with the horizontal beam.

The two knuckle joints of the vertical metal beam, give the required flexibility to the float so that during its up-down motions it is not following a curved track but follows vertical straight line.

This is a significant advantage because the cages are not in an elliptic but in a circular form and the cage is not a very complex construction but it is formed by only four vertical rails like these used for the railways. This secures the float and gives necessary stability.

Another important innovation is that the transfers of the vertical motions of the float are made directly rotational via the use of the invented metal rectangular triangle instead of the use of the biparallel level. With this innovation, the saw is not moving vertically but is moving horizontally on the ground forwards and backwards on rails without burdening the unit with its weight.

Instead of the shields placed on the gears, a second pair of gears is added in order to assist the chains to embrace much better the first pair and to avoid the disengagement. Between this mechanism and the generator, there are devices for the amplification and stabilization of the revolutions at the desired level.

The advantages of the new converter can be summarized as follows:

A. Reduction of the Cost:
1. The number of the metal parts are reduced from 5 to 4
2. The length of the vertical metal beam from 3.9 m is reduced to 2.5 m
3. The height of the unit is reduced from 3 m to 1.5 m
4. The height of the building for the roofing is reduced from 3.40 m to 1.7 m
5. The total length of the metal beams is reduced from 12.85 m to 9.15 m
6. The well for the saw is not needed
7. The base of the biparallel is not needed B. Increase of the Productivity:
1. The maximum movement of the float is increased from 2.50 m to 3 m
2. The angular movement of the horizontal level is increased from 60° to 105°
3. The weight of all moving parts of the units is significantly reduced This new invention is simple in its construction. It does not require any configuration of the seabed. It is simple and inexpensive in its operation. It does not require big waves in order to function. The application is feasible along coastlines or even in the ocean. The electric current output is direct, without any need for intermediate energy storage of any form. The transfer and conversion of the vertical motion of the sea surface, upwards-downwards is converted into a rotational motion directly to the electrical generator. Finally it is possible and easy to place a number of energy units in a series in order to form group of identical units and groups of units, which permit the standardization and mass production.

The waves of the sea move a float vertically up and down. Thus, the float rises to the crest and descends to the hollow of the wave, in a vertical upwards—downwards recalling motion. When the wave crashes against a pier, jetty or breakwater, then the reflection proportionally increases the potentiality of the wave. The entire unit has mechanisms which convert the vertical motions of the float, to horizontal and immediately to rotational directly to the electrical generator.

This sea wave energy converter, from the float to the electrical generator, forms one unit with the following main components:

1. The float (FIG. 1/No 1).
2. The vertical metal beam (2) attached to the float with knuckle joints (19).
3. The metal rectangular triangle which transfers the up-down vertical motions of the float into horizontal movements. The two perpendicular metal beams of the triangle at both ends are connected with the beam which is parallel or coincide to the hypotenuse for greater resistance to the forces exercised by the float,
4. The triangle's support mounting acting as a fulcrum (4).
5. The saw, a metal beam turned in its two ends (5) moving retrogressively in the horizontal level on rails, which keep firmly the horizontal motions.
6. Two gear chains similar to those used in a bicycle, attached to each end of the above mentioned beam, which we have named "saw". Stretched with the assistance of special stretchers (FIG. 3/16) they give the impression of a horizontally moving saw with the two chains in the place of the metal dented blade (FIG. 1/6).
7. Two pairs of gears on which the chains act, converting the horizontal movements of the saw to rotational (7). The gears, like the gears used in a bicycle, can move producing action towards one direction and freely towards the other (7).
8. The two shafts (FIG. 3/7 and 8) on which the above mentioned pairs of gears are fitted, two per each shaft. Special bases (bearings) support the shafts (FIG. 4/9).

All these components form one unit. Many units placed in parallel and side by side, form a group of units (FIG. 4). In these groups, each unit can operate independently on its own generator or operate together with another unit, in a common shaft and common generator. In this case the movements of the floats of a group can be liken to the operation of a multi-cylinder automobile engine, with many advantages from which the most important is that they use sea water instead of the polluting, inflammable, explosive and very expensive fossil fuels.

Construction and Function of Each Main Component of the Unit

The float is a plastic or metal pot, bulk or material. The diameter or the size of the float depends on the unit's desirable output. The floats have an opening in the top (10) which is used for the injection of a quantity of ballast, concrete or other heavy material (FIG. 2/11) such as to allow the float with all components of the unit to stay afloat, half-immersed in the water. In the upper part of the float there is a knuckle joint (1/19). In plastic floats, a metal beam is fitted inside the lowest part and connects the base with the knuckle joint at the top in order for all the parts, (the metal beam, the ballast, and the float) to become one body. The rest of the gap in the interior of the float is filled with light waterproof material in grains as felisol (2/14). This material, soaked in a special adhesive fluid, is compressed in order to become a compact body. This way, there is no room left for water to enter, which could otherwise possibly get into the float should it crack. The opening is sealed to become entirely watertight. The knuckle joint of the upper part of the float, connects the float with the one end of the vertical metal beam, while the other end is connected with the end (towards the sea) of the metal beam of the triangle, so that the float, the vertical metal beam and the metal triangle are moving as one part at the same time. The length of the vertical beam is convertible, so it can be modified to conform to the tidal changes of the sea surface level. The two knuckle joints of the vertical metal beam, give the required flexibility to the float so that during its up-down motions it is not following a curved track which necessarily follows the horizontal beam of the metal triangle (1/3). This metal triangle transfers the vertical up-down motions of the float, converting them to horizontal motions. The other end of the triangle, which also follows curved track (1/26), is attached to a metal arm (1/15) in order to align the motions at the end of the horizontal saw. These motions are converted to rotational movements by another mechanism.

The saw is moving forwards and backwards on rails without burdening the mechanism with its weight. At the two ends of the saw, two chains are fitted and with the use of stretchers (3/16) or with any other kind of similar mechanism, the pressure exercised on the gears is regulated so that the chains will neither become loose and get out of position, nor be in danger of breaking. The springs absorb all vibrations from the sudden changes of direction of the float, particularly in cases of rough sea conditions. When the springs are half way compressed, this is an indication that the chains are adequately taut.

The horizontal movements of the saw with the chains are converted to rotational by another mechanism (1/7) and (3/7). The chains engage the gears A and B (3/6) of the mechanism each one on the diametrically opposite side in order to avoid disengagement. In every motion of the float, one gear rotates with dynamic energy, while the other gear rotates moving freely. Thus, when the float is going up, the saw with the chains is moving horizontally towards the land (3/20). In this case, one chain rotates the gear A towards the direction (a) with dynamic energy, while the other chain rotates gear B to the opposite direction (b) freely. When the float is going down, the saw with the chains is moving towards the sea and one chain rotates gear B to the direction (c) with dynamic energy, while the other rotates the gear (A) to the opposite direction (d) freely. Thus, with every movement of the float, whether big or small upwards or downwards, the shaft rotates and activates the generator. The same applies with the second pair of gears, with the difference that the chains here engage the gears on the diametrically opposite sides in relation to the first pair (3/6). The only purpose of the second pair is to assist the chains to embrace much better the first pair and to avoid the disengagement. Between this mechanism and the generator, there are devices for the amplification and stabilization of the revolutions at the desired level.

If a problem arises in any chain and the whole unit must be immobilized, then a mechanism is activated and automatically leads the float on the upper end position where it remains locked. This mechanism is also used to immobilize a unit during scheduled maintenance works, without interrupting the operation of the other units of the group. In a case of an expected sea storm with strong wave conditions, all units of the group can be locked and secured. For such cases, the mechanism is activated automatically by sensors when the height of the waves exceeds the predetermined limits. The same mechanism returns the unit to normal operation when wave conditions return to normal.

Because extreme wave conditions appear in a limited period of time, in relation to the annual productive period, the design of such units should be based on normal wave situations, provided that in extreme conditions the operation of the units can stop. Avoiding heavy construction, the cost can be reduced.

The length of the two perpendicular beams of the metal triangle, are determined on the basis of the desired productivity of a unit but it should be taken under consideration that, as much as the length of the beam is increased towards the sea, and it decreases the vertical beam, then for bigger motions of the float, we have smaller motions of the saw, with bigger pushing force. On the opposite, as much the length of the vertical beam towards the land increases and the beam towards the sea decreases, for smaller motions of the float, we have bigger motions of the saw, but with smaller pushing force. However it is essential, that the entire mechanical system of the unit be balanced when the float is half immerged in the water. For small variations of this rule, the adjustment can be done with a counter weight (1/28) or with springs (1/18) which are stretched when the metal triangle is moving towards the sea. Such balance problems are reduced to the minimum when all components are made with light but equally durable materials, plastic (fiberglass) or duralumin. By using such material we have an additional advantage of protection from corrosion.

For improved system performance, the floats are restricted inside metal cages (4/21). These cages keep the floats in a restricted space, so that they will not be carried away by the waves. The cages do not impede either the vertical motion of the floats or the free passage of the seawater. These cages are made by metal tubes or rails according to the size of the float and the expected wave conditions in the area. Four rails like those used on railways, are placed vertically and crossed around the float, on the inner walls of the recess of the pier or breakwater or any coastal construction we may use for the converter (FIG. 4). The concrete piers are preferable because, as it is clearly proven, the effect of the piers double the energy of the incident wave and they offer a steady support for positioning all components of the unit.

The float is surrounded on its top and bottom sections with additional horizontal rubber or metal belts (1/29) for the protection from damages occurring from the attrition as sliding on the four vertical rails of the cage. These protective belts are removable by revolving them on the horizontal level periodically, whenever damages are noticed. Belts are replaced when they are totally ruined. The vertical metal beam (1/2), with the two knuckle joints (1/19) gives the float the flexibility to slide up-down inside the cage like a piston inside its cylinder.

The cage is the most important component of this sea wave technology, and is the main element of durability of the converter. The cage protects the float from the horizontal movements due to pressures of the waves. When the float is firmly protected inside the cage and the cage inside the recess of the pier, then all the forces are transferred smoothly and the converter is functioning secured even in extreme wave conditions. Without cages, floats are carried away and destroyed even with moderate winds of 2-4 Beaufort.

For a better productive function of the unit, the converter should be placed from 1.5 to 2.0 meters above the average sea surface on the pier and about 3.0 to 4.0 meters above the seabed. These limits depend on the prevailing wave condition in the area. Each unit, normally functions independently from other units; however its function can also be combined with the adjacent unit so that one or more units can act on a common shaft (4/8). Thus, the added energy does not increase the speed of the rotation but the power which can easily be converted to the required speed. When more than one unit acts on the same shaft, its rotation becomes more constant because floats are not moving up down simultaneously but the motion of each one depends on the incident wave. The advantages of each case should be considered and the experience gained through use will dictate which is the most effective solution, one generator per unit or two or three units for one more powerful generator.

The required length of coast for a group of units depends on the number of units in the group and the diameter of the floats. In piers which are specially constructed for that purpose, the cages constitute four walls of recesses, while the four vertical rails attached to the walls act as guides for the floats which slide up-down in a similar way to a platform of an elevator (1/25). The front side of the recess is open towards the sea, and the corresponding vertical rail is attached on the horizontal concrete beams (1/30). FIG. 4 indicates float arrangements in three groups, one of 5 units with 3 floats in recesses and 2 outside, a second group of 15 units with 10 floats in recesses and 5 floats in their cages outside of the recesses and a third group of 9 units with floats placed without recesses. Shock absorbers are placed at the two vertical ends of the float and also at the two ends of the two beams of the metal triangle, (one towards the sea and another towards the land); in order to limit the movements of their two predetermined terminal up-down positions. In extreme situations, the front part of the recess which is open to the sea, is partly closed with special doors in order to reduce the entrance of water to a required level so the converter can operate in all weather condition.

The ground plan in FIG. 1 indicates three floats in their recesses and their basic elements. FIG. 5 indicates the function of the converter with floats in the three different positions, one in the upper, one in the middle—average sea surface level—and the third in the bottom position. All groups are housed and protected in durable and elegantly designed constructions.

LIST OF COMPONENTS

1. The float
2. Vertical metal beam
3. Rectangular metal triangle
4. Triangle's support (fulcrum)
5. The saw
6. Chains
7. Gears
8. Shaft
9. Base bearings
10. Cap of the float
11. Ballast
12. Metal endings of the vertical beam
13. Plastic endings of the plastic float
14. Light waterproof material
15. Additional metal arm
16. Stretchers
17. Springs of stretchers
18. Resisting springs
19. Knuckle joints
20. Gears (detail)
21. Metal cages
22. Supports of cages on pier.
23. Wheels of the saw
24. Recesses
25. Vertical rails of the cage
26. Curved motions of the perpendicular beams of the metal triangle
27. Horizontal motions of the saw
28. Counter weight metal beam
29. Protective belts of the float
30. Horizontal concrete beam

Figure 1:
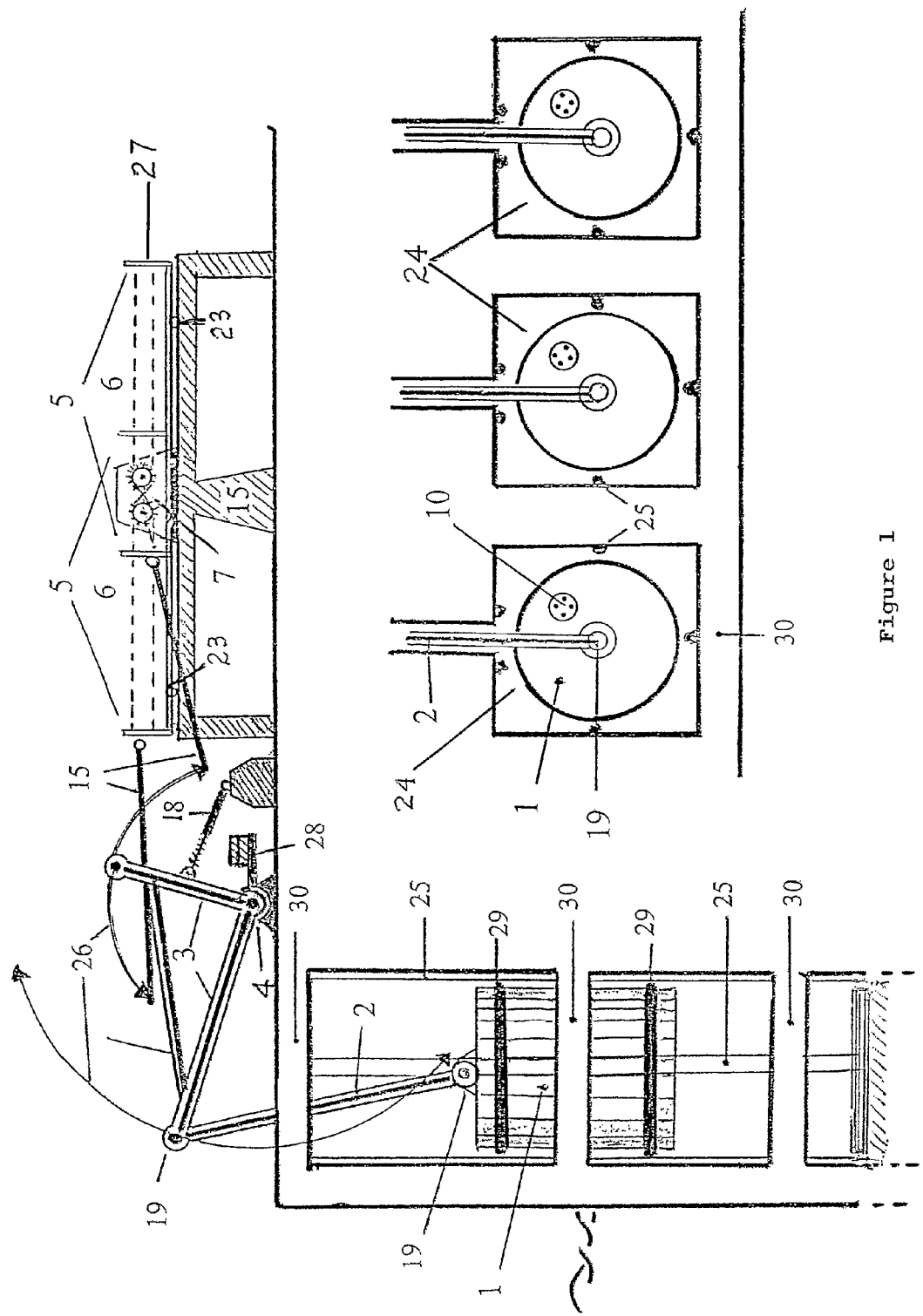
FIG. 1 is a side view of the wave electrical converter, showing the half emerged float (1) the vertical metal beam (2), the metal rectangular triangle (3), the fulcrum (4), the saw (5), the chains (6), the gears (7), the extended branch of the triangle (15), the knuckle joints of the vertical metal beam (19), the recesses in a ground plan view (24), the vertical metal rails which they consist the cages of the float (25), the belts of the float (29), and the concrete beams of the recesses (30).
Figure 2:
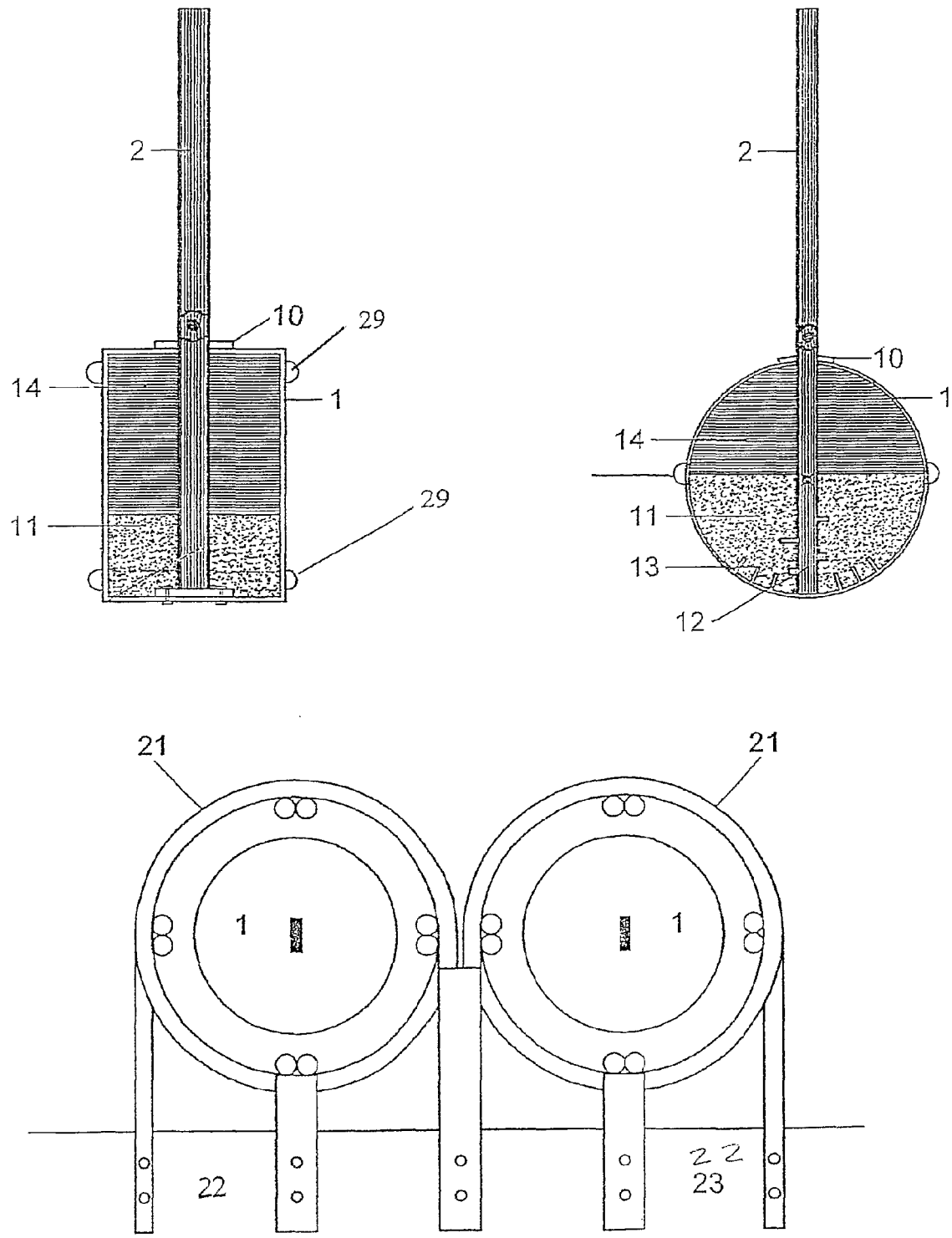
FIG. 2 is a side cross section of the plastic float showing the ballast (11), the endings of the metal beam, (12), the plastic endings of the float (13), and the light waterproof material (14). It shows also in a ground plan view two floats inside metal cages attached outside the recesses.
Figure 3:
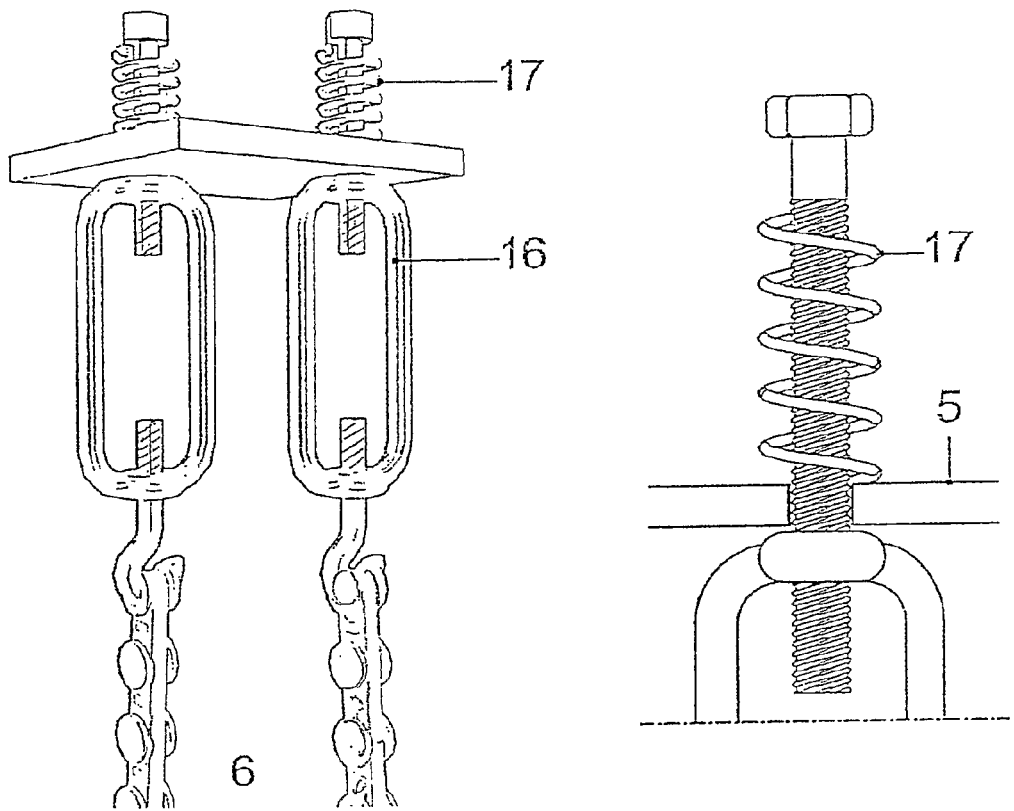
FIG. 3 shows the stretchers of the chains at each end of the saw (16) and the mechanism of conversion of the horizontal motions of the chains (6) to rotational motions of the gears A and B attached to the shaft (8).
Figure 3:
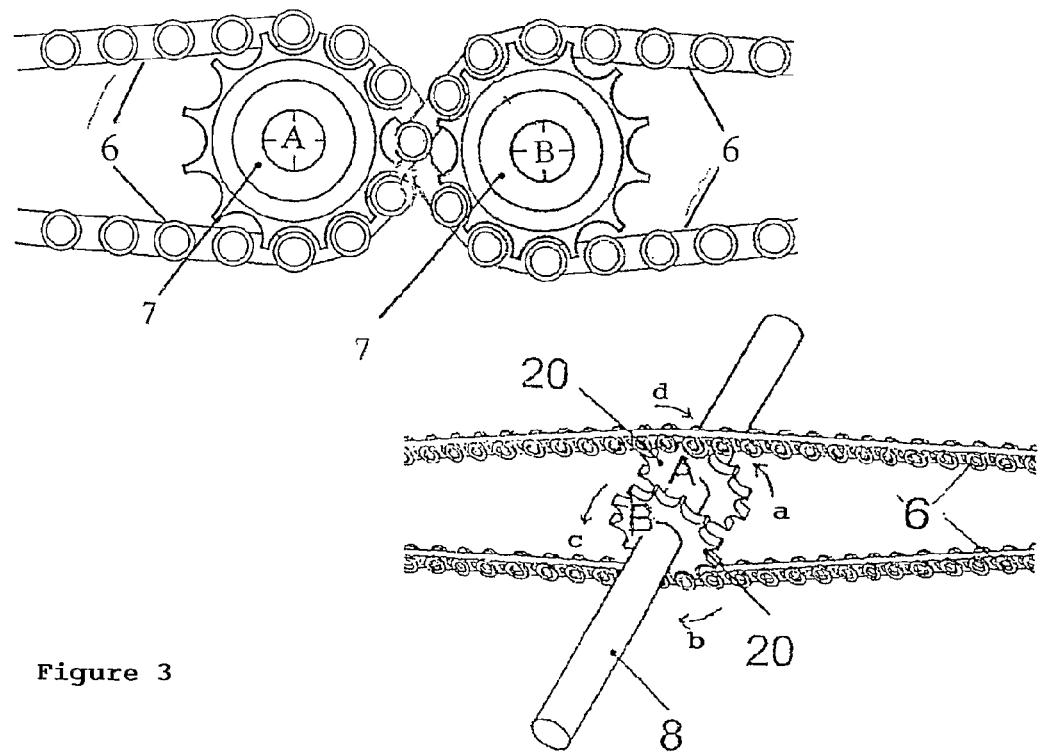
Figure 4:
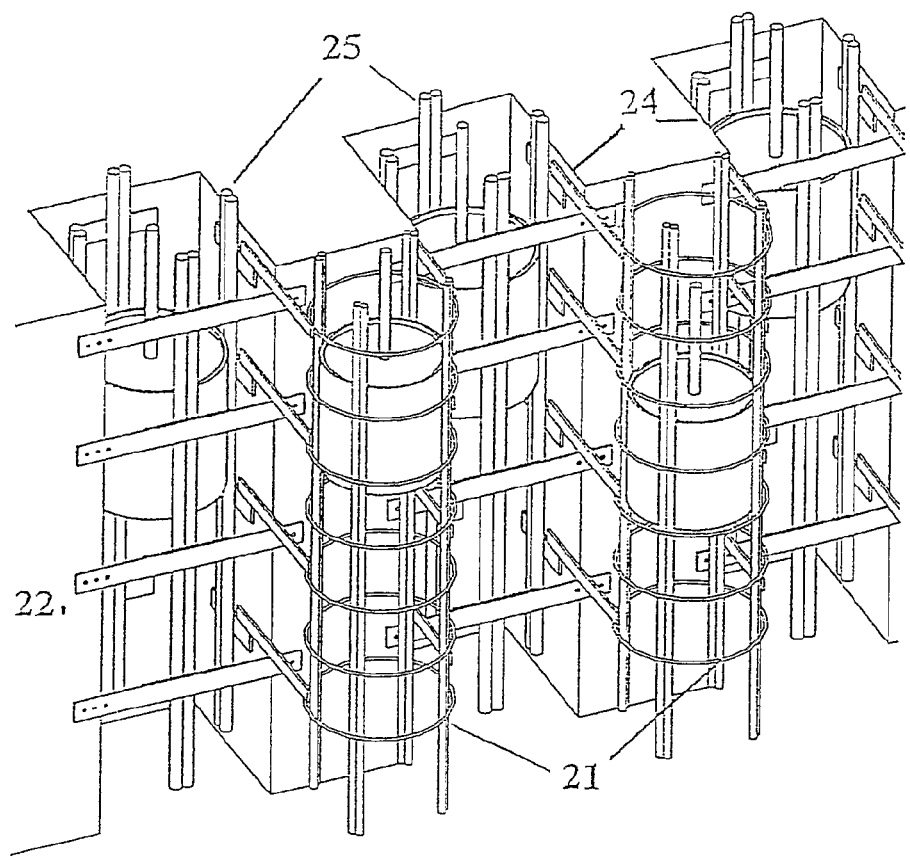
FIG. 4 shows and oblique view of three floats inside their recesses (24), and two outside of recess. The ground plan view shows the arrangement of a group of units 15 units, 10 inside recesses and 5 outside.
Figure 4:
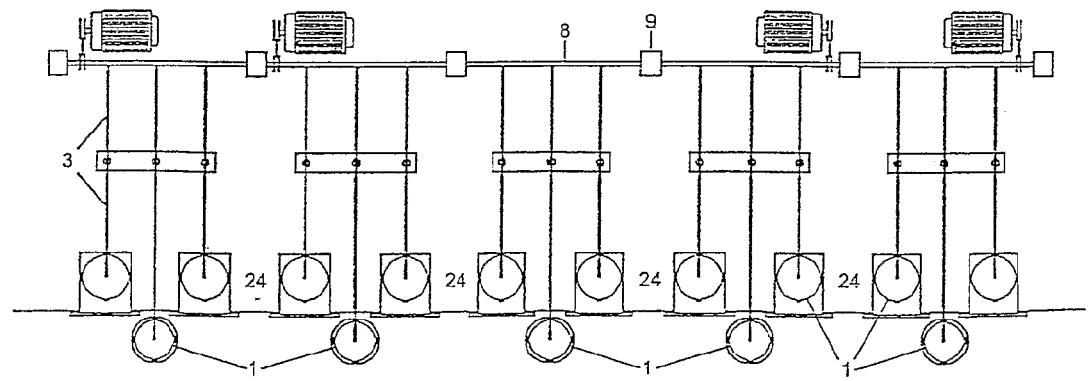
Figure 4:
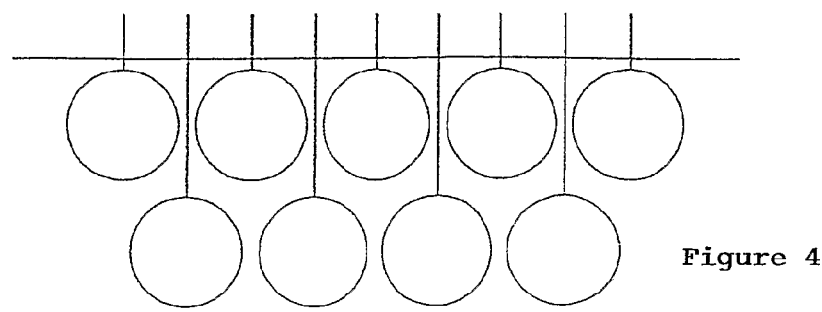
Figure 5:
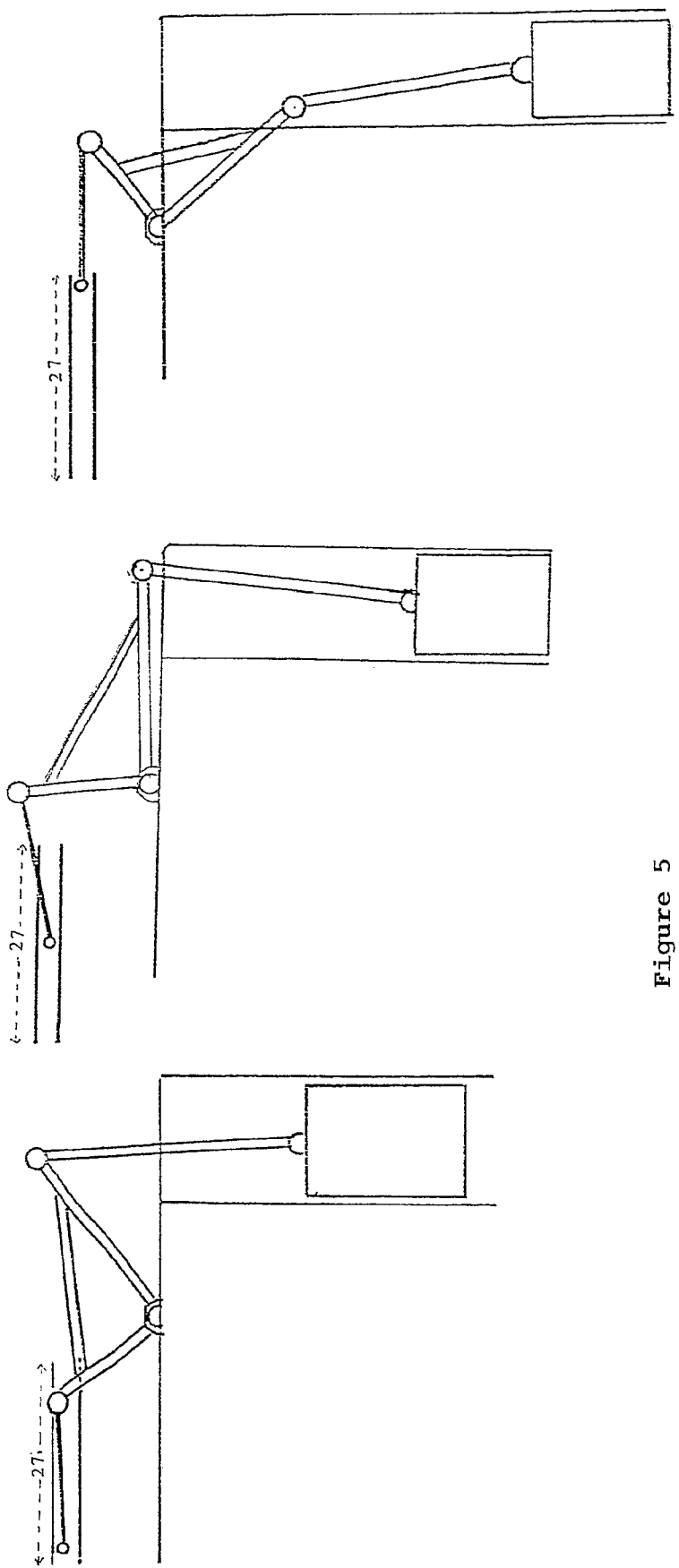
FIG. 5 shows the float in the three different positions, one in the upper, and one in the middle and the third in the bottom position.

The invention claimed is:

1. Production of electric power from the vertical motions of the sea mass characterized by a device based on shore in a natural, artificial pier or a breakwater, the device consisting of a metal or plastic cylindrical float (1/1) kept afloat half emerged, protected from side pressures and horizontal movements of the sea water inside a metal frame consisting of four vertical metal railway rails firmly fixed on the walls of the recess of the pier, this float being free to move vertically, sliding up-down following the motions of the sea surface, the motions of the float being transferred to a mechanism that converts the vertical motions to rotational ones, this mechanism consisting of two sections, the metal rectangular triangle (1/3) with its 90° corner founded in the edge of the pier inside the recess (1/4) shifts up-down, the other corner towards the sea being connected with the upper end of the intermediate vertical metal beam of the float (1/19), and the third corner of the triangle is connected to an additional metal arm (15) that acts as an intermediate between the metal triangle and the metal construction, having the shape of a reverse saw which in the place of the metal blade has two chains (3/20), these chains transferring the vertical motions of the float to two one-way gears (3/20) fixed side-by-side, one next to the other, in a common shaft (3/8), these gears rotating dynamically towards one direction and freely towards the opposite direction, the upper perimeter of gear A (3/20) embracing one chain and the bottom perimeter of the gear B embracing the other chain in such a way that in every motion of the sea surface, up or down and of any length, the shaft rotates on the same direction and activates the electrical generator.

2. Generation of electric energy from the waves of the sea according to claim 1, characterized by the fact that the vertical metal beam (1/2) attached to the float can either be increased or decreased in its length, so that the distance of the float from the horizontal end of the beam of the triangle can be modified to adapt with tidal changes of the sea surface level.

3. Generation of electric energy from the waves of the sea according to claim 1, characterized by the fact that when the float is made from plastic material, in the interior in its bottom has endings in order that, float, ballast and the beam is to become one body.

4. Generation of electric energy from the waves of the sea according to claim 1, characterized by the fact that the two rectangular beams of the metal triangle are connected with a third beam parallel or which coincides with the hypotenuse of the metal triangle which can be immobilized in the up or down positions of the float in cases of damage, of maintenance or extreme weather conditions while protective doors positioned on the front side towards the sea open part of the recess, are automatically closed.

5. Generation of electric energy from the waves of the sea according to claim 1, characterized by the fact that by installing many units in parallel and side by side we permit the converters to act independently one from the other in its own generator or to act in combination with two or more units in a common shaft of a common and more powerful generator.

\* \* \* \* \*